(12) United States Patent
Sawada

(10) Patent No.: US 7,857,929 B2
(45) Date of Patent: Dec. 28, 2010

(54) METHOD OF PRODUCING PNEUMATIC TIRE

(75) Inventor: Takahiko Sawada, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 225 days.

(21) Appl. No.: 12/300,975

(22) PCT Filed: May 22, 2007

(86) PCT No.: PCT/JP2007/060399

§ 371 (c)(1),
(2), (4) Date: Nov. 14, 2008

(87) PCT Pub. No.: WO2007/138917

PCT Pub. Date: Dec. 6, 2007

(65) Prior Publication Data

US 2009/0255620 A1    Oct. 15, 2009

(30) Foreign Application Priority Data

May 26, 2006   (JP)   ............................. 2006-146582

(51) Int. Cl.
B29D 30/20   (2006.01)
(52) U.S. Cl. ...................... 156/123; 156/134
(58) Field of Classification Search .................. 156/117, 156/123, 134, 397
See application file for complete search history.

(56) References Cited

U.S. PATENT DOCUMENTS 3,633,839 A * 1/1972 Clark ...................... 242/527.2

2003/0152740 A1 * 8/2003 van der Pluym et al. ...... 428/77
2003/0155059 A1 * 8/2003 Noel et al. ................... 152/527

FOREIGN PATENT DOCUMENTS

| JP | A 6-55661 | 3/1994 |
|----|-----------|--------|
| JP | A 8-244402 | 9/1996 |
| JP | A 8-258506 | 10/1996 |
| JP | A 10-6414 | 1/1998 |
| JP | A 2004-351810 | 12/2004 |

* cited by examiner

Primary Examiner—Justin Fischer
Assistant Examiner—Martin Rogers
(74) Attorney, Agent, or Firm—Greer, Burns & Crain, Ltd.

(57) ABSTRACT

Provided is a method of producing a pneumatic tire where occurrence of blisters caused by trapped air is prevented even if a thermoplastic resin film is used as an air permeation prevention layer. The method includes: wrapping a thermoplastic resin film (6) around a making drum (20); winding an unvulcanized tie-rubber sheet (7) on the thermoplastic resin film (6) in a manner that a winding start portion (7a) and a winding end portion (7b) of the tie-rubber sheet (7) are overlapped with each other; and thereafter winding a carcass layer (5) on the tie-rubber sheet (7). In the method, an unvulcanized auxiliary rubber sheet (9) is bonded onto the winding start portion (7a) of the tie-rubber sheet (7) so as to project in a circumferential direction, and then the tie-rubber sheet (7) is wound in a manner that the winding end portion (7b) of the tie-rubber sheet (7) is stacked on the auxiliary rubber sheet (9).

9 Claims, 5 Drawing Sheets

2A

2B

2C

3A

3B

5A

5B

METHOD OF PRODUCING PNEUMATIC TIRE

This application is a U.S. National Phase under 35 U.S.C. §371 of International Application No. PCT/JP2007/060399, filed May 22, 2007.

TECHNICAL FIELD

The present invention relates to a method of producing a pneumatic tire. More specifically, the present invention relates to a method of producing a pneumatic tire where, even if a thermoplastic resin film is used as an air permeation prevention layer, occurrence of blisters in an inner surface of the thermoplastic resin film is prevented.

BACKGROUND ART

In a tubeless pneumatic tire, the inner surface of the tire is lined integrally with an air permeation prevention layer (an inner liner), and a butyl rubber excellent in air non-permeability is used as a material for the air permeation prevention layer. However, although there is an increasing demand for a reduction in weight of pneumatic tires, it has been difficult to achieve the reduction in weight when using the butyl rubber because the butyl rubber has a large specific gravity. In this respect, Patent Document 1 proposes the use of a thermoplastic resin film having a small specific gravity as an air permeation prevention layer instead of such butyl rubber so as to enable the reduction in weight of a pneumatic tire.

However, the thermoplastic resin film has no such air absorbability as the butyl rubber has. For this reason, a problem arises in that, if air is trapped in an uncured tire in the forming of the uncured tire, the trapped air leads to occurrence of blisters in an inner surface of the thermoplastic resin film after a curing process.

A green tire before a curing process is formed as follows. A cylindrical thermoplastic resin film 6 is first wrapped around a making drum 20 as shown in Part 5A of FIG. 5. Subsequently, an unvulcanized tie-rubber sheet 7 is wound on the thermoplastic resin film 6 by one round as shown in Part 5B of FIG. 5. Thereafter, both end portions 7a and 7b of the unvulcanized tie-rubber sheet 7 are overlapped and spliced with each other to form a step-like spliced portion 11. A void 10 of trapped air having a triangular cross-sectional shape is formed between the step-like spliced portion 11 and the thermoplastic resin film 6 as shown in FIG. 6. In this state, a carcass layer is stacked thereon, so that a green tire is formed. If the green tire thus formed is cured, the air in the void 10 is not fully absorbed into the rubber layer, thus leading to occurrence of blisters. Such blisters not only significantly disfigure the inner surface of the tire, but also may cause a breakage or separation of the thermoplastic resin film during use of the tire.

Particularly, consider a case of tires, such as heavy-duty tires, in which a carcass lifting caused during a curing process is so large that an inner liner is likely to bite into carcass cords constituting a carcass layer. In this case, because a tie-rubber sheet needs to be formed with a large thickness in order to prevent the biting, such tires have a problem in that the aforementioned failure is more likely to occur.

Patent Document 1: Japanese patent application Kokai publication No. Hei 8-258506

DISCLOSURE OF THE INVENTION

Problem to be Solved by the Invention

An object of the present invention is to provide a method of producing a pneumatic tire where occurrence of blisters caused by trapped air is prevented even if a thermoplastic resin film is used as an air permeation prevention layer.

Means for Solving the Problem

A method of producing a pneumatic tire according to the present invention for achieving the above-described object includes: wrapping a thermoplastic resin film around a making drum; winding an unvulcanized tie-rubber sheet on the thermoplastic resin film in a manner that a winding start portion and a winding end portion of the tie-rubber sheet are overlapped with each other; and thereafter winding a carcass layer on the tie-rubber sheet. The method is characterized in that an unvulcanized auxiliary rubber sheet is bonded onto the winding start portion of the tie-rubber sheet so as to project in a circumferential direction, and then the tie-rubber sheet is wound in a manner that the winding end portion of the tie-rubber sheet is stacked on the auxiliary rubber sheet.

Effect of the Invention

The method of producing a pneumatic tire according to the present invention provides the following effects. In the method, when the tie-rubber sheet is wound on the thermoplastic resin film and both end portions of the tie-rubber sheet are overlapped and spliced with each other in a step-like shape, the unvulcanized auxiliary rubber sheet is bonded onto the winding start portion of the tie-rubber sheet so as to project in the circumferential direction, and then the winding end portion of the tie-rubber sheet is overlapped thereon. Accordingly, the amount of air to be trapped in the spliced portion is reduced by the auxiliary rubber sheet being provided, and the amount of air to be absorbed during a curing process is increased. As a result, occurrence of blisters can be prevented.

EXPLANATION OF THE REFERENCE NUMERALS

| | |
|---|---|
| 5 | CARCASS LAYER |
| 6 | THERMOPLASTIC RESIN FILM |
| 7 | TIE-RUBBER SHEET |
| 7a | WINDING START PORTION |
| 7b | WINDING END PORTION |
| 9 | AUXILIARY RUBBER SHEET |
| 10 | VOID OF TRAPPED AIR |
| 15 | STITCHER |
| 20 | MAKING DRUM |
| W | LENGTH OF PROJECTION OF AUXILIARY RUBBER SHEET |
| tm | THICKNESS OF AUXILIARY RUBBER SHEET |
| tg | THICKNESS OF TIE-RUBBER SHEET |

BEST MODE FOR CARRYING OUT THE INVENTION

Figure 1:
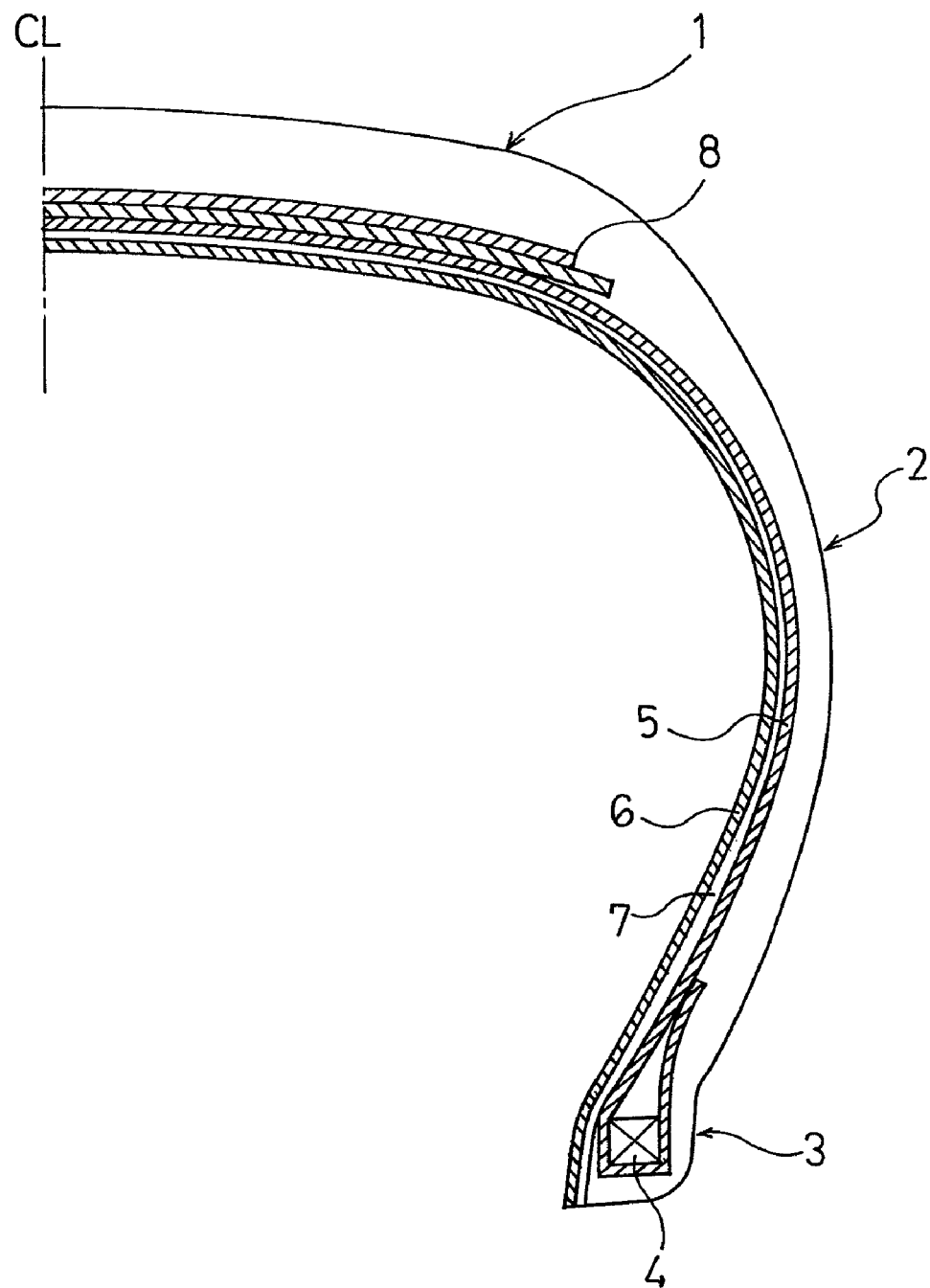
FIG. 1 is a half cross-sectional view, taken in a tire meridian direction, of an example of an embodiment of a pneumatic tire produced according to the present invention.

FIG. 1 is a half cross-sectional view taken in a tire meridian direction and showing an example of an embodiment of a pneumatic tire produced according to the present invention.

In FIG. 1, reference numeral 1 denotes a tread portion, 2 denotes sidewall portions, and 3 denotes bead portions. A carcass layer 5 is laid between a pair of right and left bead cores 4 buried respectively in the bead portions 3. Each of both end portions of the carcass layer 5 is folded back around the corresponding bead core 4 from the inside to the outside of the tire. In the tread portion 1, a pair of upper and lower belt layers 8 are disposed on the outer side of the carcass layer 5 over the entire one round of the tire. A thermoplastic resin film 6 is attached as an air permeation prevention layer to the innermost side of the pneumatic tire. A tie-rubber sheet 7 serving as an adhesive layer is interposed between the thermoplastic resin film 6 and the carcass layer 5.

Figure 5:
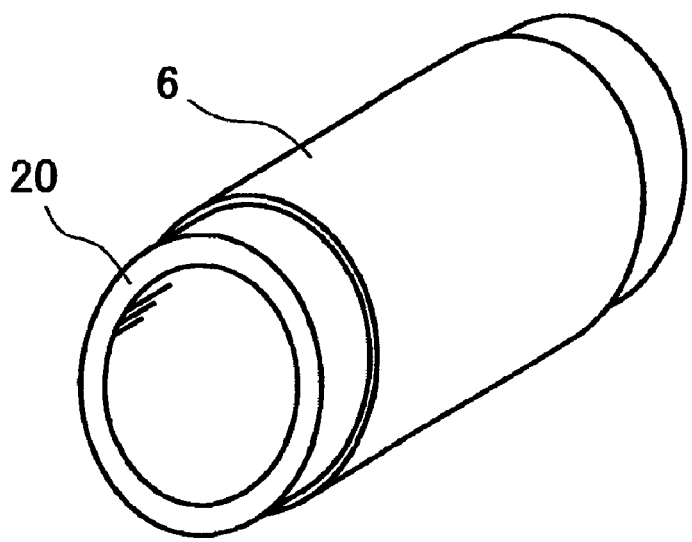
FIG. 5 Parts 5A and 5B of FIG. 5 are perspective explanatory views showing an example of a process of forming a green tire with a making drum in a conventional method of producing a pneumatic tire.
Figure 5:
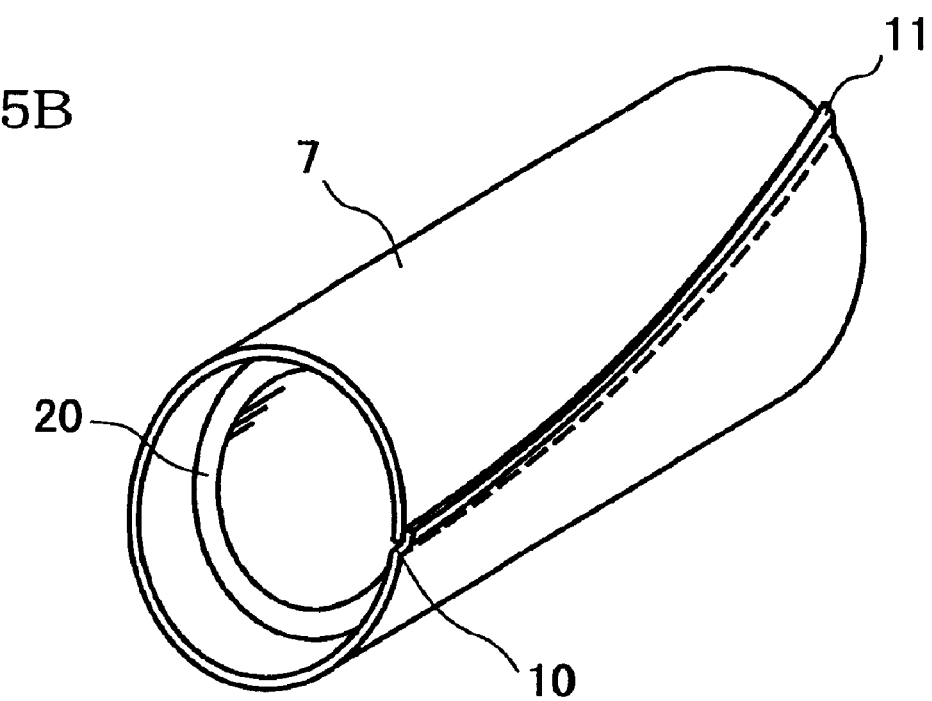

In a conventional method of producing a pneumatic tire having the above-described structure, a green tire before a curing process is formed in the following manner. As shown in Parts 5A and 5B of FIG. 5, the cylindrical thermoplastic resin film 6 is wrapped around a making drum 20, and subsequently, the unvulcanized tie-rubber sheet 7 is wound on the thermoplastic resin film 6 in a tire circumferential direction, and both end portions of the tie-rubber sheet 7 are overlapped and spliced with each other. Next, the carcass layer 5 is wound on the outer periphery of this tie-rubber sheet 7 over one round, and thereafter, the pair of right and left bead cores 4 are fitted respectively onto both end portions of the tubular carcass layer 5. Both end portions of the carcass layer 5 are then folded back in such a manner that the carcass layer 5 encloses the respective bead cores 4. Side rubbers are stacked respectively on the folded-back portions, so that a first green tire is formed. The first green tire is transferred onto a second making drum, and is expanded in diameter in such a manner that the distance between the right and left bead cores 4 is reduced. Then, the belt layers 8 and a tread rubber are stacked thereon, so that a second green tire is formed. The second green tire is inserted into a mold so as to be cured.

Figure 6:
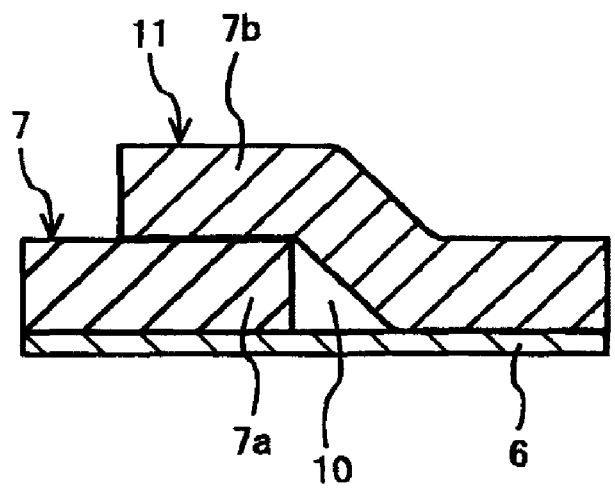
FIG. 6 is a partially enlarged view of a cross-sectional view taken in the axial direction of the drum and showing a spliced portion formed in the process of forming a green tire with the making drum in the conventional method of producing a pneumatic tire.

As described in the section of Background Art, in the conventional production method, when the tie-rubber sheet 7 is wound on the thermoplastic resin film 6, the void 10 of trapped air is formed in the step portion of the spliced portion 11, as shown in FIG. 6. Accordingly, the air trapped in the void 10 is expanded and grown in the mold-curing process, thus bringing about a failure in which blisters are generated. Further, in some cases, air is taken in from the void after the second green tire is formed, possibly resulting in a failure in that the thermoplastic resin film comes off if the second green tire is left untreated for a long time.

Figure 2:
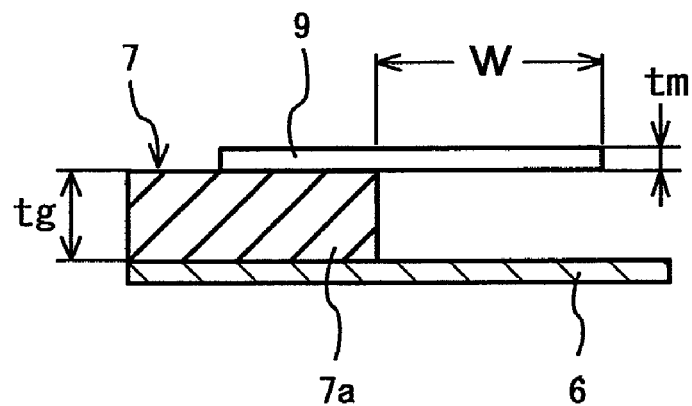
FIG. 2 Parts 2A to 2C of FIG. 2 are partially enlarged views of cross-sectional views, taken in a drum axial direction, of a spliced portion formed in a forming process using the drum in the embodiment of the method of producing a pneumatic tire according to the present invention.
Figure 2:
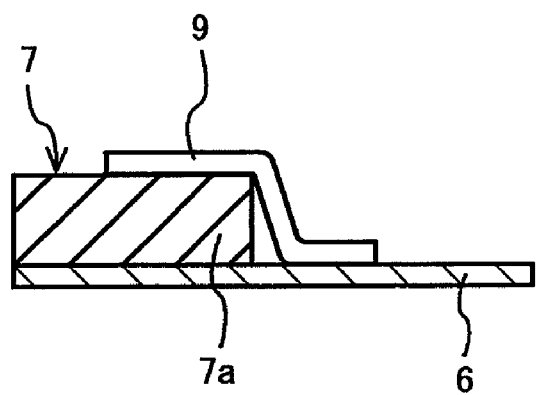
Figure 2:
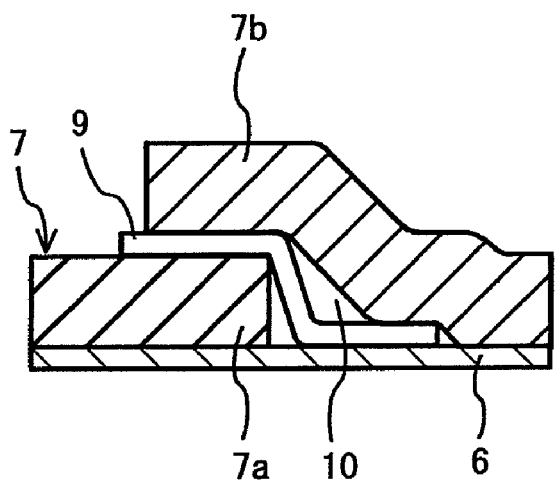

On the other hand, in the production method according to the present invention, when the tie-rubber sheet 7 is wound on the thermoplastic resin film 6, as shown in Part 2A of FIG. 2, an auxiliary rubber sheet 9 is bonded onto a winding start portion 7a of the tie-rubber sheet 7 in a manner that the auxiliary rubber sheet 9 projects by a length (W) in the circumferential direction. Subsequently, as shown in Part 2B of FIG. 2, the auxiliary rubber sheet 9 is wrapped around the end surface of the winding start portion 7a. Thereafter, as shown in Part 2C of FIG. 2, a winding end portion 7b of the tie-rubber sheet 7 having been wound on the outer periphery of the thermoplastic resin 6 over one round is overlapped and spliced with the winding start portion 7a in a manner of being stacked on the auxiliary rubber sheet 9. Accordingly, this results in a structure where the auxiliary rubber sheet 9 is inserted in the void formed between the winding start portion 7a and the winding end portion 7b, so that the volume of the void of trapped air can be reduced. Moreover, because the auxiliary rubber sheet 9 absorbs the air in the void during the curing process, occurrence of blisters is prevented.

Figure 4:
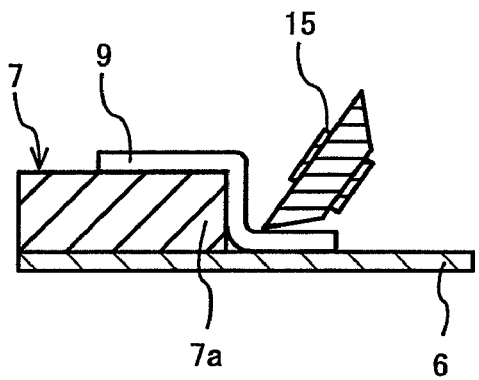
FIG. 4 is a partially enlarged view of a cross-sectional view, taken in the drum axial direction and corresponding to Part 2B of FIG. 2, of still another embodiment of the method of producing a pneumatic tire according to the present invention.

As for the auxiliary rubber sheet 9 bonded onto the winding start portion 7a of the tie-rubber sheet 7 as shown in Part 2A of FIG. 2, stitching is preferably performed from above the auxiliary rubber sheet as shown in FIG. 4. By stitching, air trapped on the end surface of the winding start portion 7a of the tie-rubber sheet is pushed to the outside, so that the size of the void of trapped air can be reduced. Moreover, after the winding end portion 7b of the tie-rubber sheet 7 is spliced with the winding start portion 7a as shown in Part 2C of FIG. 2, stitching is also preferably performed from thereabove. This makes it possible to further reduce the size of the void trapped in the outer side portion of the auxiliary rubber sheet. Meanwhile, the stitching is preferably performed before the end portions of the carcass layer having been wound on the tie-rubber sheet are folded back respectively around the bead cores.

In the present invention, the length (W) by which the auxiliary rubber sheet 9 projects from the winding start portion 7a of the tie-rubber sheet 7 in the circumferential direction may be set to be 1 to 10 times the thickness (tg) of the tie-rubber sheet 7. If the length (W) of projection is less than the thickness (tg) of the tie-rubber sheet, it is impossible for the auxiliary rubber sheet to sufficiently exhibit the effect of reducing the volume of void of trapped air and the effect of absorbing air during the curing process, both produced by the auxiliary rubber sheet. If the length (W) of projection exceeds 10 times the thickness (tg) of the tie-rubber sheet, the weight of the tire increases and the uniformity may be deteriorated.

Figure 3:
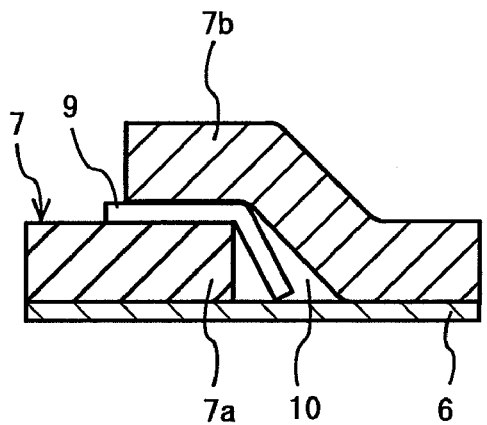
FIG. 3 Parts 3A and 3B of FIG. 3 are partially enlarged views of cross-sectional views, taken in the drum axial direction and corresponding to Part 2C of FIG. 2, of another embodiment of the method of producing a pneumatic tire according to the present invention.
Figure 3:
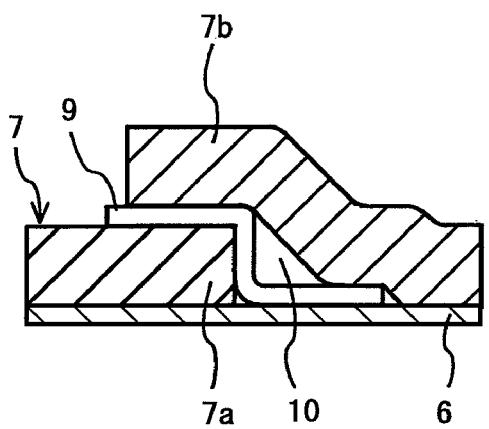

The auxiliary rubber sheet 9 having the length (W) of projection set as described above may have a free end kept inside the void 10 of trapped air as shown in Part 3A of FIG. 3, or may have an end further extending to be sandwiched between the thermoplastic resin film 6 and the winding end portion 7b of the tie-rubber sheet 7 as shown in Part 3B of FIG. 3.

The thickness (tm) of the auxiliary rubber sheet is preferably in a range from 0.1 times to 0.4 times the thickness (tg) of the tie-rubber sheet. If the auxiliary rubber sheet is thinner than 0.1 times the thickness (tg) of the tie-rubber sheet, the effect of reducing the volume of void 10 of trapped air and the effect of absorbing air during the curing process become insufficient. On the other hand, if the auxiliary rubber sheet is thicker than 0.4 times the thickness (tg) of the tie-rubber sheet, the height of the step of the spliced portion of the tie-rubber sheet is increased, so that the amount of trapped air is increased, and that the uniformity may possibly be deteriorated. To be specific, the thickness (tm) of the auxiliary rubber sheet is preferably in a range from 0.1 mm to 0.4 mm, and more preferably in a range from 0.2 mm to 0.3 mm.

The Mooney viscosity of the auxiliary rubber sheet is preferably not more than the Mooney viscosity of the tie-rubber sheet. Making the Mooney viscosity of the auxiliary rubber sheet not more than the Mooney viscosity of the tie-rubber sheet allows the projecting portion of the auxiliary rubber sheet from the winding start portion of the tie-rubber sheet to follow the edge shape of the winding start portion of the tie-rubber sheet. Accordingly, the auxiliary rubber sheet is more tightly bonded, so that the gap is likely to be reduced. To be specific, the Mooney viscosity of the auxiliary rubber sheet is preferably in a range from 30 to 50. If the Mooney viscosity exceeds 50, the flexibility becomes insufficient, and if less than 30, the workability for attachment is decreased. Note that, the Mooney viscosity is a value $ML_{1+4}$ at 100° C. measured according to JIS K6300.

The thickness (tg) of the tie-rubber sheet is generally in a range from 0.3 mm to 4.0 mm. In particular, a tie-rubber sheet used for a heavy-duty tire has a thickness in a range from 1.0 mm to 4.0 mm. If the thickness of the tie-rubber sheet for a heavy-duty tire is less than 1.0 mm, it is impossible to sufficiently prevent carcass cords of the carcass layer from biting into the thermoplastic resin. If the thickness exceeds 4.0 mm, the volume of void of trapped air formed in the step of the spliced portion is increased to make it impossible to avoid occurrence of blisters. Accordingly, such thicknesses are not preferable.

The rubber composition constituting the auxiliary rubber sheet may be the same as or different from that of the tie-rubber sheet, and is not particularly limited as long as being any of those conventionally used as tire materials. For example, a rubber composition used for the auxiliary rubber sheet may be one formed by adding a compounding ingredient such as carbon black, a process oil, or a curing agent to a diene rubber, such as NR, IR, BR, or SBR; an ethylene-propylene copolymer rubber; styrene elastomer; or the like.

The thermoplastic resin film is preferably a single- or multiple-layer cylindrical thermoplastic resin film prepared from a thermoplastic resin composition by a general extrusion molding, for example, by an inflation molding. The resin for the thermoplastic resin film is not particularly limited as long as can be subjected to a melt molding. The thermoplastic resin film is preferably made of, for example, a thermoplastic resin, such as a polyamide resin, a polyester resin, a polynitrile resin, a polymethacrylate resin, or a polyvinyl resin; a copolymer composed mainly of one of those resins; or a resin composition containing one of these resin components as a main component. The resin composition is preferably a thermoplastic resin composition containing one of the above thermoplastic resins as a matrix and any elastomer component as a domain. Such elastomer is preferably an olefin elastomer, a styrene elastomer, or the like.

The method of producing a pneumatic tire according to the present invention particularly shows its effect in the production of a heavy-duty tire that requires a thick tie-rubber sheet, and is useful for a reduction in blisters.

Hereinafter, the present invention will be described by giving examples; however, the scope of the present invention is not limited by these examples.

EXAMPLES

Examples 1 to 3 and Conventional Example

Four types of green tires (Examples 1 to 3 and Conventional Example) each having a tire size of 195/65R15 and a tire structure shown in FIG. 1 were formed. In each of the green tires, a cylindrical thermoplastic resin film (having a 0.2 mm thickness) was used as an air permeation prevention layer, and a tie-rubber sheet having a 0.7 mm thickness and a carcass layer were overlapped and spliced with the air permeation prevention layer. In addition, these green tires were formed to be different from one another, when the above described tie-rubber sheet was wound, as shown in Table 1, in whether or not an auxiliary rubber sheet was used, the length (W) of projection, and whether or not stitching was performed. Each of these four types of green tires was inserted into a curing mold and cured therein, and then was evaluated in terms of the size of void of trapped air in the green tire thus formed, whether or not blisters had occurred after the curing process, and the uniformity (RFV index). As a result of the evaluation, the results shown in Table 1 were obtained.

[Measurement of Volume of Void]

As the size of void of trapped air, visually evaluated were the number of void formed in a winding start portion of the tie-rubber sheet in the center of the tread portion, the maximum floating length of the void in the tire circumferential direction, and the length of the void in the tire width direction, by observation through the semi-transparent thermoplastic resin film from the inner surface of each green tire thus formed.

[Evaluation of Occurrence of Blisters]

Whether or not blisters had occurred was visually evaluated in the inner surface of a pneumatic tire obtained by curing each green tire.

[Measurement of Uniformity (RFV Index)]

The RFV test was carried out according to JASO C607 on the pneumatic tire obtained by curing each green tire, so that the RFV of the pneumatic tire was measured. Then, these pneumatic tires were evaluated by indices where the measured value of the tire of Conventional Example was taken as 100. The smaller the index value is, the more excellent the tire is in the uniformity.

TABLE 1

| | Conventional Example | Example 1 | Example 2 | Example 3 |
|---|---|---|---|---|
| Schematic Embodiment | FIG. 6 | Part 3A of FIG. 3 | Part 2C of FIG. 2 | Part 3B of FIG. 3 |
| Thickness of Auxiliary Rubber Sheet [mm] | — | 0.3 | 0.3 | 0.3 |
| Length (W) of Projection of Auxiliary Rubber Sheet [mm] | — | 1 | 7 | 7 |
| Whether or not Stitching was performed on Auxiliary Rubber Sheet | No | No | No | Yes |
| Number of Voids of Trapped Air [voids] | 5 | 2 | 1 | 1 |
| Maximum Floating Length of Void in Tire Circumferential Direction [mm] | 5.0 | 2.0 | 1.0 | 0.5 |
| Length of Void in Tire Width Direction [mm] | 20 | 5.0 | 2.0 | 1.0 |

TABLE 1-continued

| | Conventional Example | Example 1 | Example 2 | Example 3 |
|---|---|---|---|---|
| Occurrence of Blisters | Yes | No | No | No |
| Uniformity (RFV Index) | 100 | 102 | 101 | 101 |

What is claimed is:

1. A method of producing a pneumatic tire comprising:
   wrapping a thermoplastic resin film around a making drum;
   winding an unvulcanized tie-rubber sheet on the thermoplastic resin film in a manner that a winding start portion and a winding end portion of the tie-rubber sheet are overlapped with each other; and thereafter
   winding a carcass layer on the tie-rubber sheet, wherein
   an unvulcanized auxiliary rubber sheet is bonded onto the winding start portion of the tie-rubber sheet so as to project in a circumferential direction, and then
   the tie-rubber sheet is wound in a manner that the winding end portion of the tie-rubber sheet is stacked on the auxiliary rubber sheet.

2. The method of producing a pneumatic tire according to claim 1, wherein a length (W) by which the auxiliary rubber sheet projects from the winding start portion of the tie-rubber sheet is in a range from 1 to 10 times a thickness (tg) of the tie-rubber sheet.

3. The method of producing a pneumatic tire according to claim 1, wherein a thickness (tm) of the auxiliary rubber sheet is in a range from 0.1 to 0.4 times the thickness (tg) of the tie-rubber sheet.

4. The method of producing a pneumatic tire according to claim 3, wherein the thickness of the auxiliary rubber sheet is in a range from 0.1 mm to 0.4 mm.

5. The method of producing a pneumatic tire according to claim 1, wherein the thickness of the tie-rubber sheet is in a range from 0.3 mm to 4.0 mm.

6. The method of producing a pneumatic tire according to claim 1, wherein a Mooney viscosity of the auxiliary rubber sheet is not more than a Mooney viscosity of the tie-rubber sheet.

7. The method of producing a pneumatic tire according to claim 6, wherein the Mooney viscosity of the auxiliary rubber sheet is in a range from 30 to 50.

8. The method of producing a pneumatic tire according to claim 1, wherein after the auxiliary rubber sheet is bonded onto the winding start portion of the tie-rubber sheet, stitching is performed from above the auxiliary rubber sheet.

9. The method of producing a pneumatic tire according to claim 1, wherein after the winding end portion of the tie-rubber sheet is overlapped and spliced with the winding start portion, stitching is performed from above the auxiliary rubber sheet.

* * * * *